United States Patent
Schönhoff et al.

(10) Patent No.: US 7,192,214 B2
(45) Date of Patent: Mar. 20, 2007

(54) SEALING BELLOWS WITH SNAP-ON CONNECTION

(75) Inventors: Stefan Schönhoff, Osnabrück (DE); Frank Budde, Damme (DE)

(73) Assignee: ZF Lemörder Metallwaren AG (DE)

( * ) Notice: Subject to any disclaimer, the term of this patent is extended or adjusted under 35 U.S.C. 154(b) by 0 days.

(21) Appl. No.: 10/485,327

(22) PCT Filed: Mar. 20, 2003

(86) PCT No.: PCT/DE03/00927

§ 371 (c)(1),
(2), (4) Date: Jan. 28, 2004

(87) PCT Pub. No.: WO03/083317

PCT Pub. Date: Oct. 9, 2003

(65) Prior Publication Data

US 2004/0232629 A1    Nov. 25, 2004

(30) Foreign Application Priority Data

Mar. 28, 2002 (DE) ............................... 102 14 349

(51) Int. Cl.
*F16C 11/00* (2006.01)

(52) U.S. Cl. .................... 403/134; 403/50; 403/51; 403/122

(58) Field of Classification Search ................ 403/50, 403/51, 122, 134
See application file for complete search history.

(56) References Cited

U.S. PATENT DOCUMENTS

| | | | | |
|---|---|---|---|---|
| 3,378,286 A | * | 4/1968 | Gottschald | .................... 403/51 |
| 4,378,935 A | * | 4/1983 | Brown et al. | ............. 267/64.27 |
| 4,475,845 A | * | 10/1984 | Odill et al. | .................... 404/25 |
| 4,597,745 A | | 7/1986 | Orian | |
| 4,657,229 A | | 4/1987 | Thurow | |
| 5,005,808 A | * | 4/1991 | Warmuth et al. | ........ 267/64.27 |
| 5,066,159 A | | 11/1991 | Urbach | |
| 5,725,433 A | | 3/1998 | Kudo et al. | |
| 6,308,959 B1 | | 10/2001 | Sokolihs et al. | |

FOREIGN PATENT DOCUMENTS

| | | |
|---|---|---|
| DE | 925 328 | 4/1955 |
| DE | 1 168 717 | 4/1964 |
| DE | 1 575 708 | 1/1970 |
| DE | 34 39 972 | 5/1985 |
| DE | 33 46 108 | 7/1985 |
| DE | 43 04 774 | 8/1994 |
| DE | 195 42 406 | 6/1996 |
| DE | 197 27 494 | 2/1999 |
| DE | 198 47 294 | 10/1999 |
| DE | 199 50 281 | 6/2001 |
| EP | 0 942 189 | 9/1999 |
| GB | 1005682 | 9/1965 |

\* cited by examiner

*Primary Examiner*—Daniel P. Stodola
*Assistant Examiner*—Michael P. Ferguson
(74) *Attorney, Agent, or Firm*—McGlew & Tuttle, PC

(57) ABSTRACT

A sealing bellows is provided having a jacket (1*b*) arranged between first and second edges (1*a*, 1*c*) of the sealing bellows. The edges (1*a*, 1*c*) of the sealing bellows are sealingly in contact with components in the assembled state of the sealing bellows (1). At least a first edge (1*a*) of the sealing bellows has radially inwardly pointing teeth (3*a*), which engage a contour of a component or a housing (2) of a ball and socket joint to form a snap connection.

19 Claims, 5 Drawing Sheets

SEALING BELLOWS WITH SNAP-ON CONNECTION

FIELD OF THE INVENTION

The present invention pertains to a sealing bellows for ball and socket joints, especially for motor vehicles, the sealing bellows having a jacket arranged between a first edge and a second edge of the sealing bellows, wherein the edges of the sealing bellows are sealingly in contact with components in the assembled state of the sealing bellows.

BACKGROUND OF THE INVENTION

Packings or sealing systems, also called rubber bellows, are frequently used in the area of chassis engineering. They are located, e.g., in the area of ball and socket joints or drive axles. The packings or rubber bellows have the function of a seal, which separate the inner functional area of, e.g., a ball and socket joint, from outside effects during both rotary movements and tilting movements. As a result, additional wear, e.g., in the form of friction and corrosion, is avoided. The edges of the bellows are usually provided with additional straining rings, which apply pressure to the mostly metallic components, e.g., the housing of a ball and socket joint or a pivot, so that the sealing bellows is secured against slipping off in the axial direction. These sealing bellows or packings usually also have additional collars projecting inwardly in the radial direction, which extend behind projections on the components and thus ensure an additional axial fixation in addition to the straining ring. Such sealing bellows of this class for ball and socket joints are known from DE-OS 1 575 708, DE-OS 1 168 717 as well as DE-PS 925 328.

The drawback of the sealing bellows or packings of this kind is that an additional straining ring is always needed for the secure axial fixation of the sealing bellows, so that not only are additional parts needed, but the assembly effort is also relatively high as a result.

SUMMARY OF THE INVENTION

The object of the present invention is to provide a sealing bellows that avoids the above-described drawbacks.

According to the invention, a sealing bellows is provided with a jacket arranged between a first edge and a second edge of the sealing bellows. The edges of the sealing bellows are sealingly in contact with components in the assembled state of the sealing bellows. A first edge of the sealing bellows has radially inwardly pointing teeth. The present invention also comprises the use of the sealing bellows according to the present invention for ball and socket joints.

The sealing bellows according to the present invention has the advantage that no straining ring is needed for the sealing and durable fastening of the bellows to a component. The sealing bellows can be advantageously pushed easily over a component with its teeth, the teeth being bent over due to their shape and pivoting into corresponding recesses of the component. The teeth advantageously have the shape of sawteeth, so that the teeth can be bent over in one direction only. As a result, the sealing bellows can slip off from the component unintentionally only if a force that may possibly destroy the bellows is applied.

The teeth may be made in one piece with the sealing bellows. However, it is also possible for the teeth to be injection molded in one piece with the sealing bellows, e.g., by means of a two-component technique. It is also possible for the sealing ring carrying the teeth to be injection molded with or bonded to the sealing bellows.

By providing a plurality of circular rows of teeth, a very good sealing is achieved between the sealing bellows and the component. Due to the absence of the straining ring in the area of the teeth, a dynamic connection is obtained, which is advantageously designed as a snap connection. It can be guaranteed by the advantageous embodiment of the component that the edge of the sealing bellows, which carries the teeth, can no longer move in the axial direction, i.e., in the direction of the pivot.

It is obviously possible for each edge of the sealing bellows to have corresponding teeth, so that a straining ring is no longer needed for both sides. However, it is, of course, also possible for an edge of the sealing bellows to be secured statically against unintentional separation by means of a straining ring. Thus, this edge of the sealing bellows may have sealing lips, which come sealingly into contact with the component due to the action of the force of the straining ring. The edge of the sealing bellows advantageously has an outwardly pointing, circular groove for receiving the sealing ring for this purpose, so that the sealing ring cannot unintentionally slip off the sealing bellows after the assembly.

All plastics may be generally considered for use as the material for the teeth or the snap hook connection. However, thermoplastics, which possess good tribological and elastic properties, are preferred.

Possible embodiments of sealing bellows according to the present invention and ball and socket joints according to the present invention will be explained in greater detail below on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
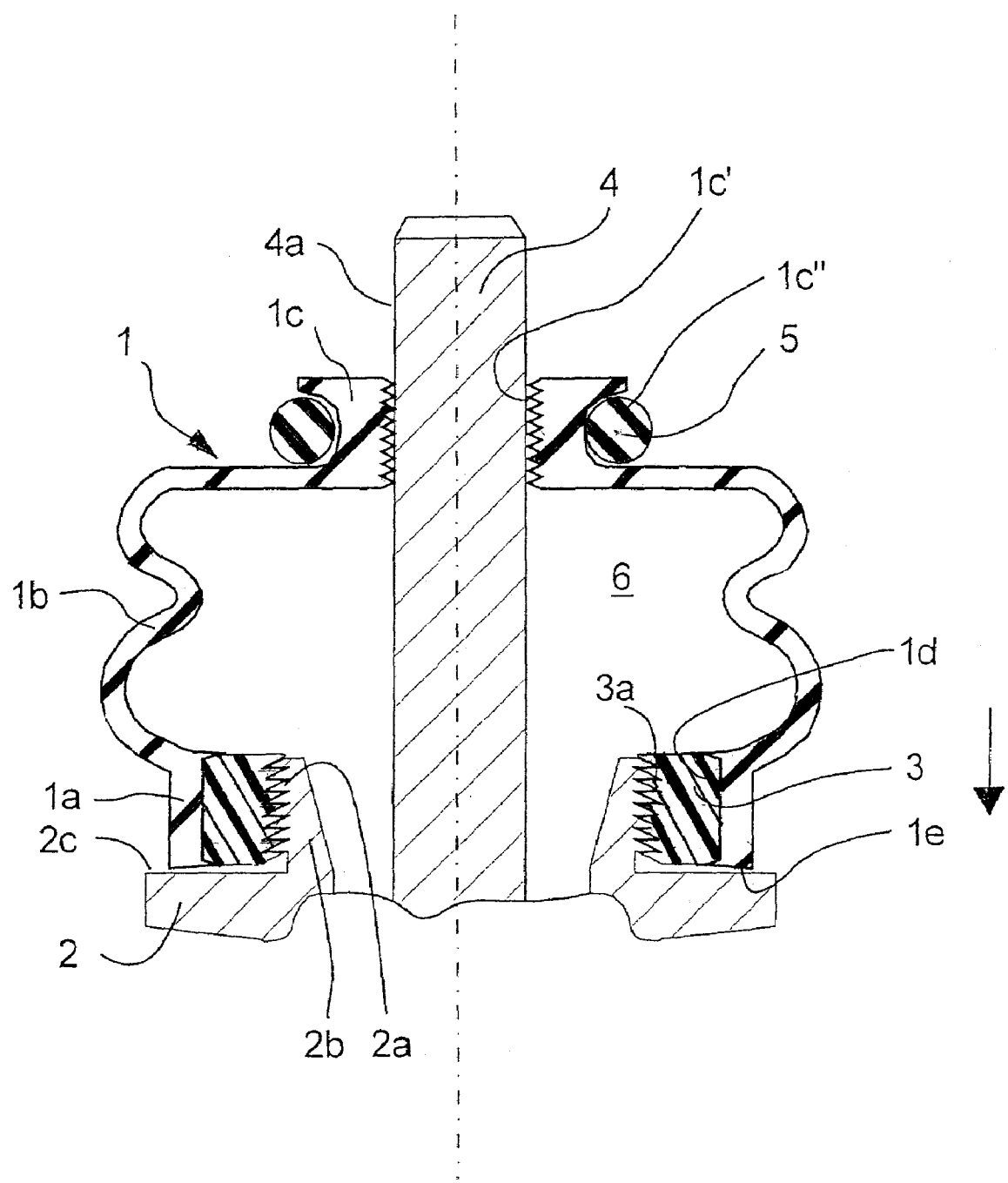
FIG. 1 is a cross-sectional view of a ball and socket joint protected by means of a sealing bellows according to the present invention.
Figure 2:
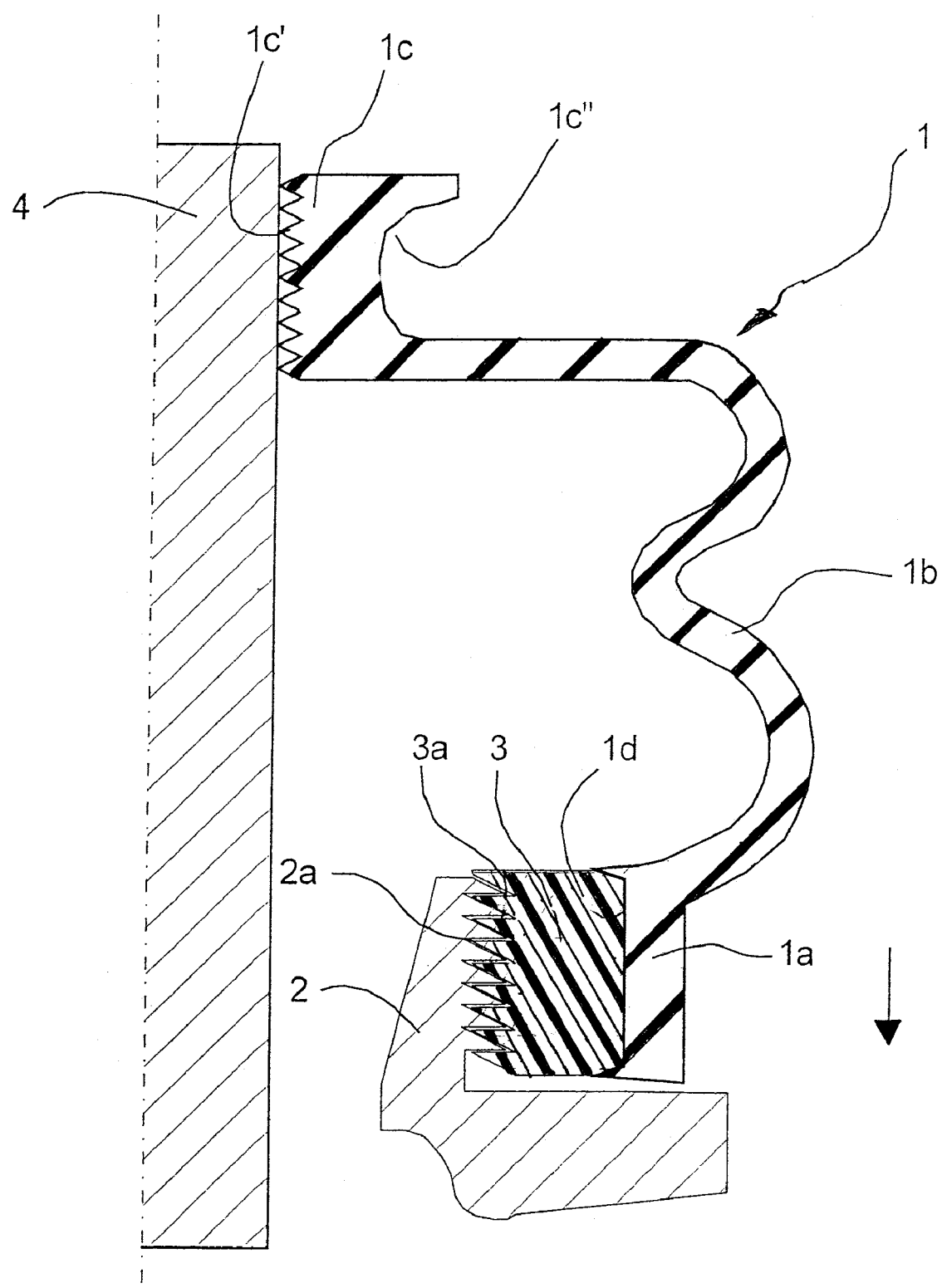
FIG. 2 is an enlarged detail of FIG. 1.

Referring to the drawings in particular, FIGS. 1 and 2 show the detail of a ball and socket joint, comprising a housing 2, which accommodates a socket, not shown. A ball pivot 4 with its joint ball, not shown, is located in the socket of the housing 2. The ball and socket joint is sealingly enclosed by a sealing bellows 1. The sealing space is enclosed by the packing and the jacket 1b, and the two edges 1a and 1c of the sealing bellows are sealingly in contact with the housing 2, which consists mostly of metal, and the pivot 4. The edges 1a and 1c of the sealing bellows are made in one piece with the jacket 1b. The edge 1a of the sealing bellows has a cylindrical inner surface, around which a sealing ring 3 is prepared by injection, bonded or tacked. On its radially inwardly facing side, the sealing ring 3 has teeth 3a extending in a circular pattern, which cooperate with the likewise circularly extending teeth 2a of the housing 2. The teeth 3a of the sealing ring 3 are sawtooth-shaped, so that the sealing bellows 1 can be pushed over the housing 2 in the direction of the arrow relatively without problems, but it cannot unintentionally slip off same. The teeth 2a of the housing 2 are arranged on a collar-like projection 2b of the housing, and the teeth 2a point radially outwardly. The housing 2 forms a limitation with the wall 2c arranged at the collar-like projection 2b, and the limitation prevents the teeth 3a from being unintentionally displaced farther in the direction of the arrow in the assembled state. The sealing ring 3 as well as the edge 1c of the sealing bellows are made of an elastic material, as a result of which a pretension can be achieved in the radial direction, which allows the teeth of the sets of teeth to firmly engage each other. Due to the sawtooth structure, the teeth act like a snap connection. The other edge 1c of the sealing bellows has sealing lips 1c', which are sealingly in contact with the surface 4a of the pivot 4. A sealing ring 5 is located in a correspondingly shaped, circular groove 1c" of the edge 1c of the sealing bellows and generates a centripetal pressing force for the sealing lips 1c', so that reliable sealing is obtained between the pivot 4 and the sealing bellows 1 against moisture and dirt. The jacket 1b of the sealing bellows is likewise made of an elastic material, so that the pivot 4 and the housing 2 can move in relation to each other.

Figure 3:
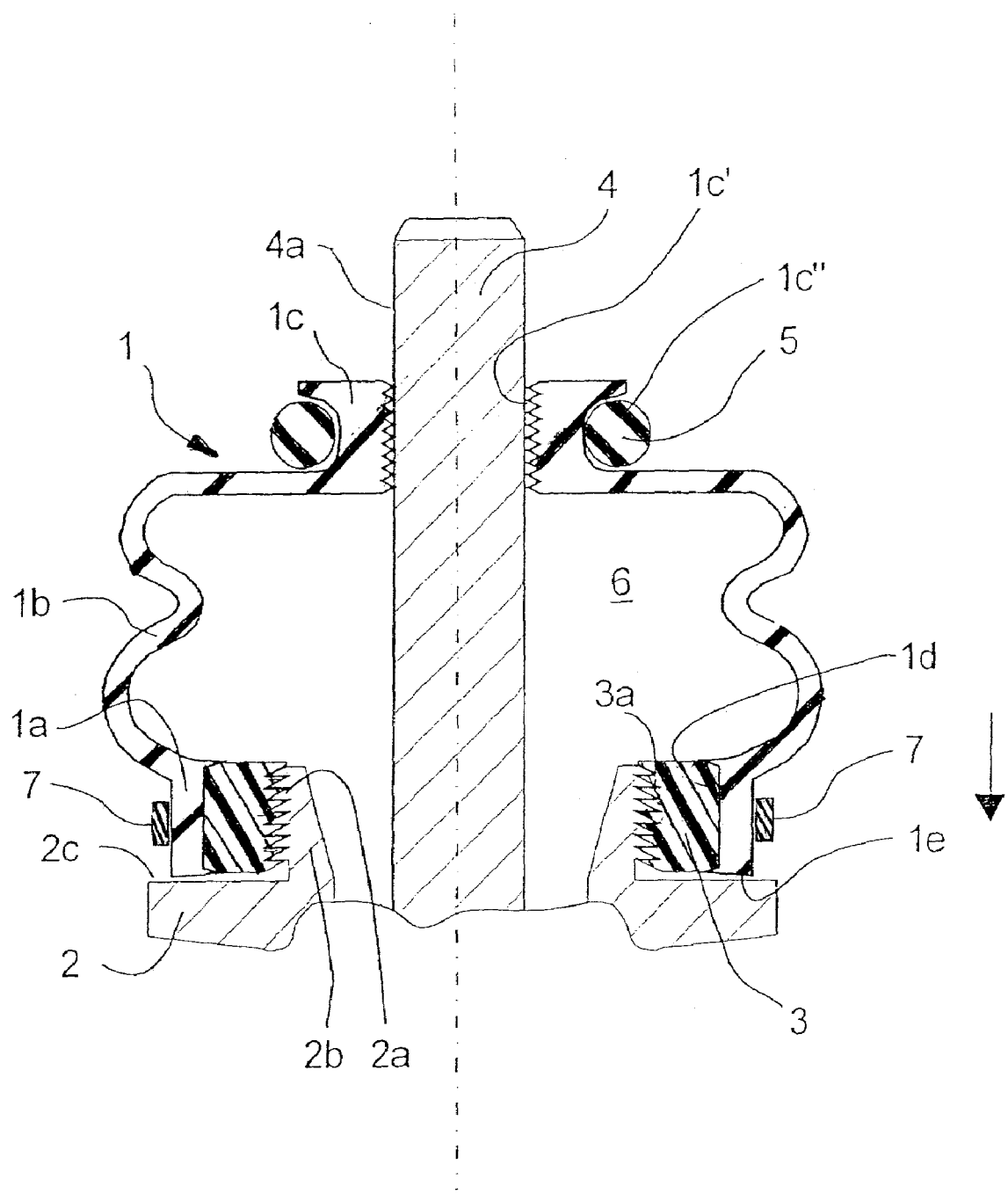
FIG. 3 is a cross-sectional view of another possible embodiment with an optional straining ring.

FIG. 3 shows an optional straining ring 7, which applies an additional force in the centripetal direction to the sealing teeth 3a, 2a. As a result, stronger sealing is achieved by the teeth meshing with each other more strongly. It is, of course, possible for the edge 1a of the sealing bellows to have a circular groove for receiving and securing the straining ring 7 in the axial direction on its radially outwardly pointing side. The additional straining ring 7 is used to further improve the sealing and does not represent a turning away from the original idea of the invention.

Figure 4:
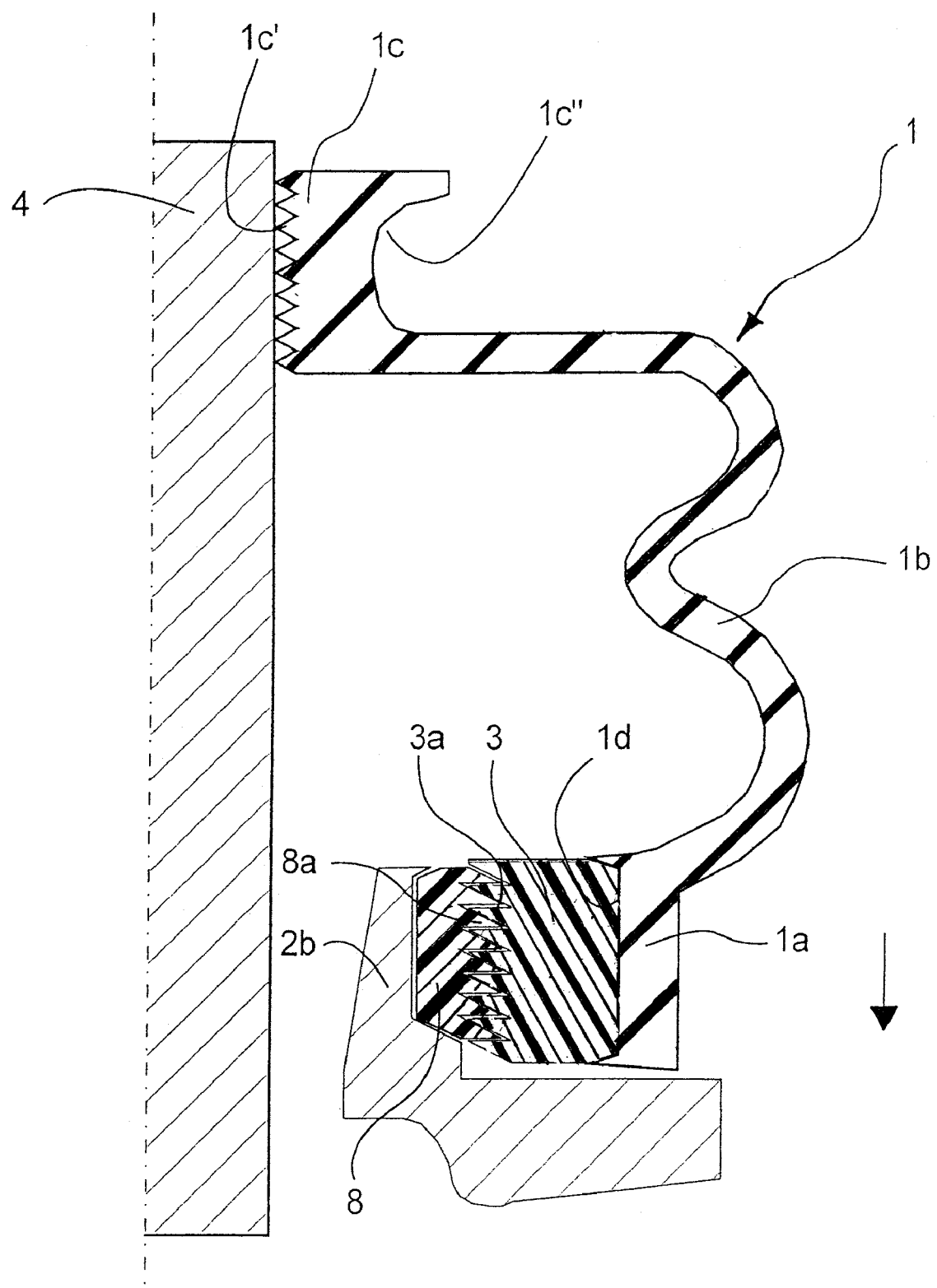
FIG. 4 is a cross-sectional view of another possible embodiment with an additional tooth element, which is arranged on a component, e.g., a ball and socket joint housing.

FIG. 4 shows another alternative embodiment, in which an additional sealing ring 8 is arranged at a projection 2b of the housing 2. With its radially inwardly pointing jacket surface, the sealing ring 8 is in contact with the projection 2b. The projection 2b may form a circular groove, in which the additional sealing ring 8 can be seated secured in the axial direction. The sealing ring 8 may be optionally bonded, welded or tacked to the housing 2. However, it is also possible for the sealing ring 8 to be prepared by injection molding or vulcanization in one piece. On its radially outwardly pointing side, the sealing ring 8 has circular teeth 8a, which cooperate with the teeth 3a of the sealing bellows 1. The sealing ring 8 may be made, e.g., of metal, rubber or plastic, especially a thermoplastic elastomer (TPE).

Figure 5:
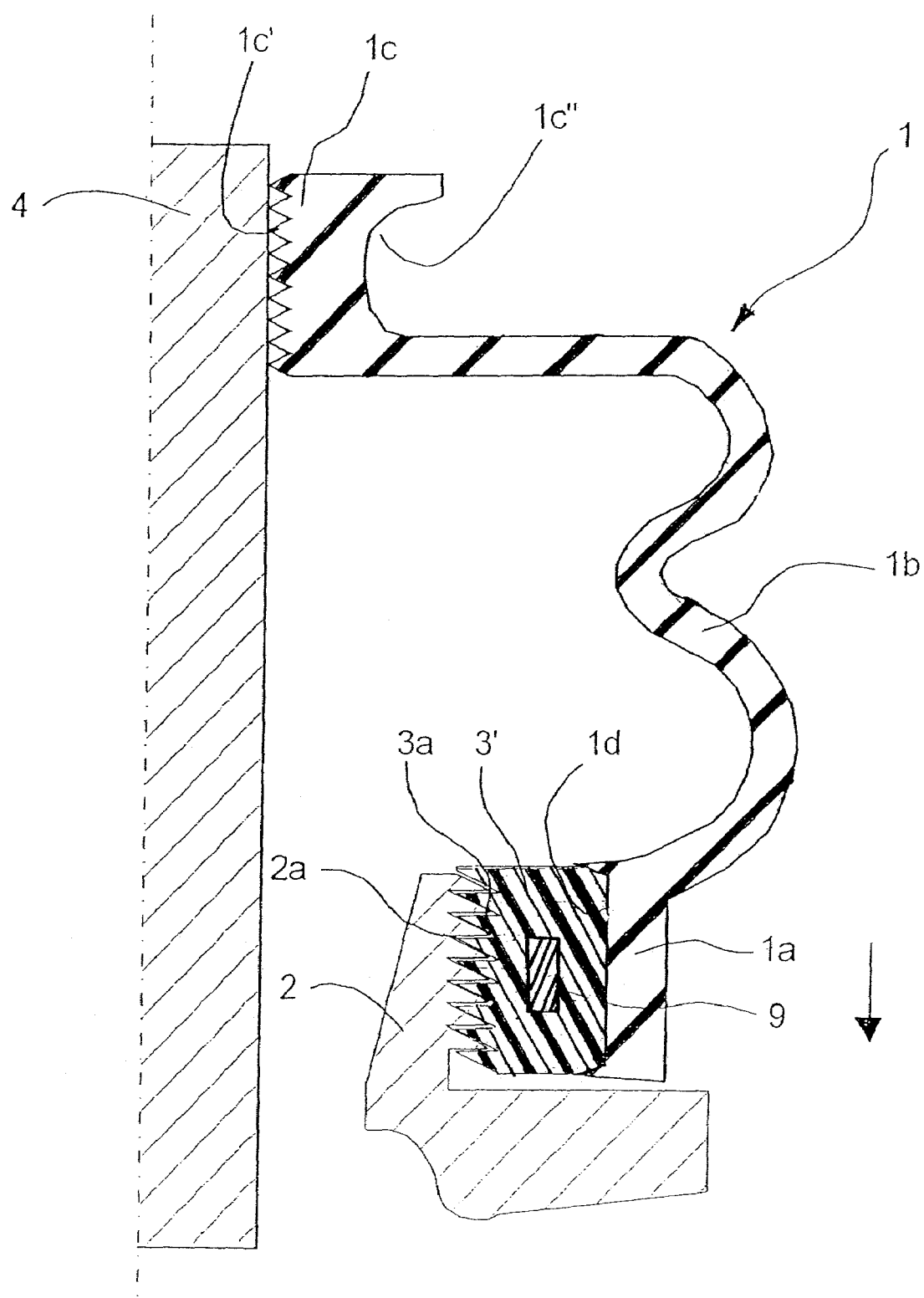
FIG. 5 is another possible embodiment with a ring made of metal or plastic, which is incorporated by vulcanization or is extrusion coated.

FIG. 5 shows another design of the embodiment according to FIGS. 1 and 2, in which the sealing ring 3 has a ring 9 incorporated by injection molding or vulcanization. The ring 9 may be, e.g., a metal ring for reinforcement.

It applies to all the above-described exemplary embodiments that the teeth may be greased. It is advantageously achieved hereby that the sealing bellows 1 can be pushed more easily over the housing 2 because of the reduced friction. In addition, better sealing action is achieved hereby. However, because of the teeth, the grease has no adverse effect on the locking of the teeth in the assembled state.

It also applies to all the above-described exemplary embodiments that the teeth are preferably made by means of plastic as the material, and that the sealing bellows is made of rubber. It is, of course, also possible to select other combinations of materials if this is necessary for the particular intended use.

While specific embodiments of the invention have been shown and described in detail to illustrate the application of the principles of the invention, it will be understood that the invention may be embodied otherwise without departing from such principles.

The invention claimed is:

1. A ball and socket joint for motor vehicles, the ball and socket joint comprising:
   a housing with a surface contour;
   a ball pivot which can be pivoted in the housing and/or is mounted rotatably in said housing, said ball pivot having a smooth and even surface in a bellows contact area;
   a sealing bellows comprising a sealing bellows jacket, said sealing bellows being arranged between a first sealing bellows edge and a second sealing bellows edge, said first edge having radially inwardly pointing teeth cooperating with said surface contour of said housing, wherein said surface contour corresponds to a contour of said teeth, said second edge of the sealing bellows having a sealing bellows edge with radially inwardly pointing teeth in sealing contact with said smooth and even surface of said ball pivot bellows contact area, said radially inwardly pointing teeth of said first edge being formed by a sealing ring defining a separate part from said sealing bellows jacket, said sealing ring being connected to said sealing bellows jacket to form said sealing bellows.

2. A ball and socket joint in accordance with claim 1, wherein the two sets of teeth of said housing and said sealing bellows first edge are sawtooth-shaped, wherein the oblique flanks of the teeth of the sealing bellows point in a direction of a direction of assembly of the sealing bellows and the oblique flanks of the teeth of the housing point opposite the direction of assembly of the sealing bellows.

3. A ball and socket joint in accordance with claim 1, wherein said surface contour corresponding to a contour of said teeth includes housing teeth arranged radially outwardly at a projection extending into the sealing bellows, wherein the housing wall adjoining the projection limits the movement by which the sealing bellows is pulled over the housing.

4. A ball and socket joint in accordance with claim 1, further comprising grease disposed between said teeth of said sealing bellows first edge and said corresponding surface contour of said housing to achieve easier assembly and better sealing action.

5. A ball and socket joint in accordance with claim 1, wherein said sealing ring is connected to said sealing bellows jacket by a molding formation of said sealing bellows jacket or bonded to said sealing bellows jacket.

6. A ball and socket joint in accordance with claim 1, wherein said sealing ring is made of plastic and said sealing bellows jacket is made of rubber.

7. A ball and socket joint for motor vehicles, the ball and socket joint comprising:
   a housing with a surface contour;
   a ball pivot which can be pivoted in the housing and/or is mounted rotatably in said housing, said ball pivot having a bellows contact area;

a sealing bellows arranged between said housing and said pivot and extending from a first sealing bellows edge, in contact with said housing to a second sealing bellows edge, in contact with said pivot and comprising a sealing bellows jacket and a separate part sealing ring connected to said sealing bellows jacket, said sealing ring defining said first edge and having radially inwardly pointing teeth cooperating with said surface contour of said housing, wherein said surface contour of said housing has teeth corresponding to a contour of said sealing ring teeth.

8. A ball and socket joint in accordance with claim 7, wherein said bellows contact area comprises a smooth and even surface and said second edge of the sealing bellows has radially inwardly pointing teeth in sealing contact with said smooth and even surface of said ball pivot bellow contact area.

9. A ball and socket joint in accordance with claim 8, wherein the two sets of teeth of said housing and said sealing bellows jacket first edge are saw tooth-shaped, wherein the oblique flanks of the teeth of the sealing bellows point in a direction of assembly of the sealing bellows and the oblique flanks of the teeth of the housing point opposite the direction of assembly of the sealing bellows.

10. A ball and socket joint in accordance with claim 9, wherein said surface contour corresponding to a contour of said teeth includes housing teeth arranged radially outwardly at a projection extending into the sealing bellows, wherein the housing wall adjoining the projection limits the movement by which the sealing bellows is pulled over the housing.

11. A ball and socket joint in accordance with claim 10, further comprising grease disposed between said teeth of said sealing bellows first edge and said corresponding surface contour of said housing to achieve easier assembly and better sealing action.

12. A ball and socket joint in accordance with claim 8, wherein said sealing ring is connected to said sealing bellows jacket by a molding formation of said sealing bellows jacket or bonding said sealing ring to said sealing bellows jacket.

13. A ball and socket joint in accordance with claim 8, wherein said sealing ring is made of plastic and said sealing bellows jacket is made of rubber.

14. A ball and socket joint for motor vehicles, the ball and socket joint comprising:
  a housing with a surface contour;
  a ball pivot which can be pivoted in said housing and/or is mounted rotatably in said housing, said ball pivot having a smooth and even surface in a bellows contact area;
  a sealing bellows arranged between said housing and said pivot and extending from a first sealing bellows edge, in contact with said housing to a second sealing bellows edge, in contact with said pivot and comprising a rubber sealing bellows jacket and a plastic sealing ring, said plastic sealing ring defining said first edge and having radially inwardly pointing teeth cooperating with said surface contour of said housing, wherein said surface contour of said housing has teeth corresponding to a contour of said sealing ring teeth, said second edge of the sealing bellows having rubber radially inwardly pointing teeth formed integrally with said sealing bellows jacket and in sealing contact with said smooth and even surface of said ball pivot bellows contact area.

15. A ball and socket joint in accordance with claim 14, wherein the two sets of teeth of said housing and said sealing bellows jacket first edge are sawtooth-shaped, wherein the oblique flanks of the teeth of the sealing bellows point in a direction of assembly of the sealing bellows and the oblique flanks of the teeth of the housing point opposite the direction of assembly of the sealing bellows.

16. A ball and socket joint in accordance with claim 15, wherein said surface contour corresponding to a contour of said teeth includes housing teeth arranged radially outwardly at a projection extending into the sealing bellows, wherein the housing wall adjoining the projection limits the movement by which the sealing bellows is pulled over the housing.

17. A ball and socket joint in accordance with claim 16, further comprising grease disposed between said teeth of said sealing bellows first edge and said corresponding surface contour of said housing to achieve easier assembly and better sealing action.

18. A ball and socket joint for motor vehicles, the ball and socket joint comprising:
  a housing with a surface contour;
  a ball pivot which can be pivoted in the housing and/or is mounted rotatably in said housing, said ball pivot having a smooth and even surface in a bellows contact area;
  a sealing bellows comprising a sealing bellows jacket, said sealing bellows being arranged between a first sealing bellows edge and a second sealing bellows edge, said first edge having radially inwardly pointing teeth cooperating with said surface contour of said housing, wherein said surface contour corresponds to a contour of said teeth, said second edge of the sealing bellows having a sealing bellows edge with radially inwardly pointing teeth in sealing contact with said smooth and even surface of said ball pivot bellows contact area, said radially inwardly pointing teeth of said first edge being formed by a sealing ring defining a separate part from said sealing bellows jacket, said sealing ring being connected to said sealing bellows jacket to form said sealing bellows, said sealing ring being connected to said sealing bellows jacket by a molding formation of said sealing bellows jacket or bonded to said sealing bellows jacket.

19. A ball and socket joint for motor vehicles, the ball and socket joint comprising:
  a housing with a surface contour;
  a ball pivot which can be pivoted in the housing and/or is mounted rotatably in said housing, said ball pivot having a smooth and even surface in a bellows contact area;
  a sealing bellows comprising a sealing bellows jacket, said sealing bellows being arranged between a first sealing bellows edge and a second sealing bellows edge, said first edge having radially inwardly pointing teeth cooperating with said surface contour of said housing, wherein said surface contour corresponds to a contour of said teeth, said second edge of the sealing bellows having a sealing bellows edge with radially inwardly pointing teeth in sealing contact with said smooth and even surface of said ball pivot bellows contact area, said radially inwardly pointing teeth of said first edge being formed by a scaling ring defining a separate part from said sealing bellows jacket, said sealing ring being connected to said sealing bellows jacket to form said sealing bellows, said sealing ring being composed of plastic and said sealing bellows jacket being composed of rubber.

* * * * *

UNITED STATES PATENT AND TRADEMARK OFFICE
CERTIFICATE OF CORRECTION

PATENT NO. : 7,192,214 B2 Page 1 of 1
APPLICATION NO. : 10/485327
DATED : March 20, 2007
INVENTOR(S) : Schönhoff et al.

It is certified that error appears in the above-identified patent and that said Letters Patent is hereby corrected as shown below:

On the title page item (73), should read -- ZF Lemförder Metallwaren AG  (DE) --

Signed and Sealed this

Fifteenth Day of May, 2007

JON W. DUDAS
*Director of the United States Patent and Trademark Office*